June 27, 1944.    Q. H. CARLTON    2,352,470
FLUID PRESSURE REMOTE CONTROL SYSTEM
Filed June 26, 1942    3 Sheets-Sheet 1

INVENTOR
Q. H. CARLTON
By: Stevens and Davis
Attys.

June 27, 1944.   Q. H. CARLTON   2,352,470
FLUID PRESSURE REMOTE CONTROL SYSTEM
Filed June 26, 1942   3 Sheets-Sheet 2

INVENTOR
Q. H. CARLTON
By: Stevens and Davis
ATTYS.

June 27, 1944.     Q. H. CARLTON     2,352,470

FLUID PRESSURE REMOTE CONTROL SYSTEM

Filed June 26, 1942     3 Sheets-Sheet 3

INVENTOR
Q. H. CARLTON
By: Stevens and Davis
ATTYS.

Patented June 27, 1944

2,352,470

UNITED STATES PATENT OFFICE 2,352,470

FLUID PRESSURE REMOTE CONTROL SYSTEM

Quintin Healey Carlton, Leamington Spa, England, assignor to Automotive Products Company Limited, Leamington Spa, England Application June 26, 1942, Serial No. 448,640
In Great Britain March 24, 1941

7 Claims. (Cl. 121—38)

This invention relates to fluid pressure remote control systems.

It is an object of the invention to provide an improved method and means for causing the piston of a motor unit to move automatically to a predetermined position between the ends of its stroke whenever pressure fluid is supplied to a predetermined connection. It is a further object of the invention to provide a liquid pressure remote control system having improved means for placing the pipe lines into connection with the reservoir of the system when the latter is not being operated.

According to the invention, the improved method of causing a double-acting motor piston to assume a predetermined setting intermediate the ends of its stroke consists in operatively connecting the said piston with a change-over valve adapted to connect a supply of pressure liquid with one or other working space of the motor, the position of the piston at change-over being arranged to coincide with the said predetermined setting.

According to a further aspect of the invention, a motor unit for a fluid pressure remote control system comprises a movable member urged in opposite directions by fluid pressure in one or other of a pair of working spaces, interchangeable flow and return pipe lines leading to said spaces, and a change-over valve which, when fed with pressure fluid, conducts it to either one of said working spaces, depending upon the state of the valve, the latter being connected operatively with the movable member so that, by changing over when the said member reaches a predetermined position in its stroke, the valve serves to maintain the movable member in the said predetermined position as long as said valve is fed with pressure fluid.

Preferably, a pair of fluid actuated cut-off valve devices are provided, these being respectively interposed between each branch of the change-over valve and the corresponding working space of the motor unit. A movable member may comprise a double-acting piston arranged to slide within a motor cylinder. Further, the change-over valve may be provided with a rocker which is connected with the movable member conveniently by a lost-motion device, which latter may be operative on both sides of the predetermined position at which the change-over valve is changed over. The lost-motion device may comprise a rocker having a substantially V-shaped cam surface which is engaged by a member connected with the movable member of the motor unit, said change-over valve comprising a pair of valves each having a push rod by which it is urged off its seat by the movable member of the motor unit. If desired, each of the cut-off valve devices may comprise a partition piston disposed within a bore and arranged to be forced in one direction by pressure fluid supplied through the corresponding main pipe line, and in the other direction by fluid supplied through the auxiliary pipe line, the resulting movement of the partition piston serving to connect the said working space of the motor unit with the pipe line through which the fluid is being supplied, and to isolate said working space from the other of the above-mentioned two pipe lines.

According to a further aspect of the invention, there is provided a liquid pressure remote control system having a motor unit as above described, the arrangement being such that a control valve device, through which pressure liquid is fed to either one of the main pipe lines or to the auxiliary pipe line, is provided with a time-controlled valve device which causes pressure liquid to be fed from the source for only a predetermined and limited period each time the setting of the control valve device is changed. Preferably, the time-controlled valve device comprises a piston valve member having its movement governed by a dash-pot device, said piston valve member being moved against the action of a spring, by a cam which is operatively connected with means for actuating a selector-valve portion of the control valve device.

The invention is illustrated by way of example in the accompanying diagrammatic drawings, in which.

Figure 1:
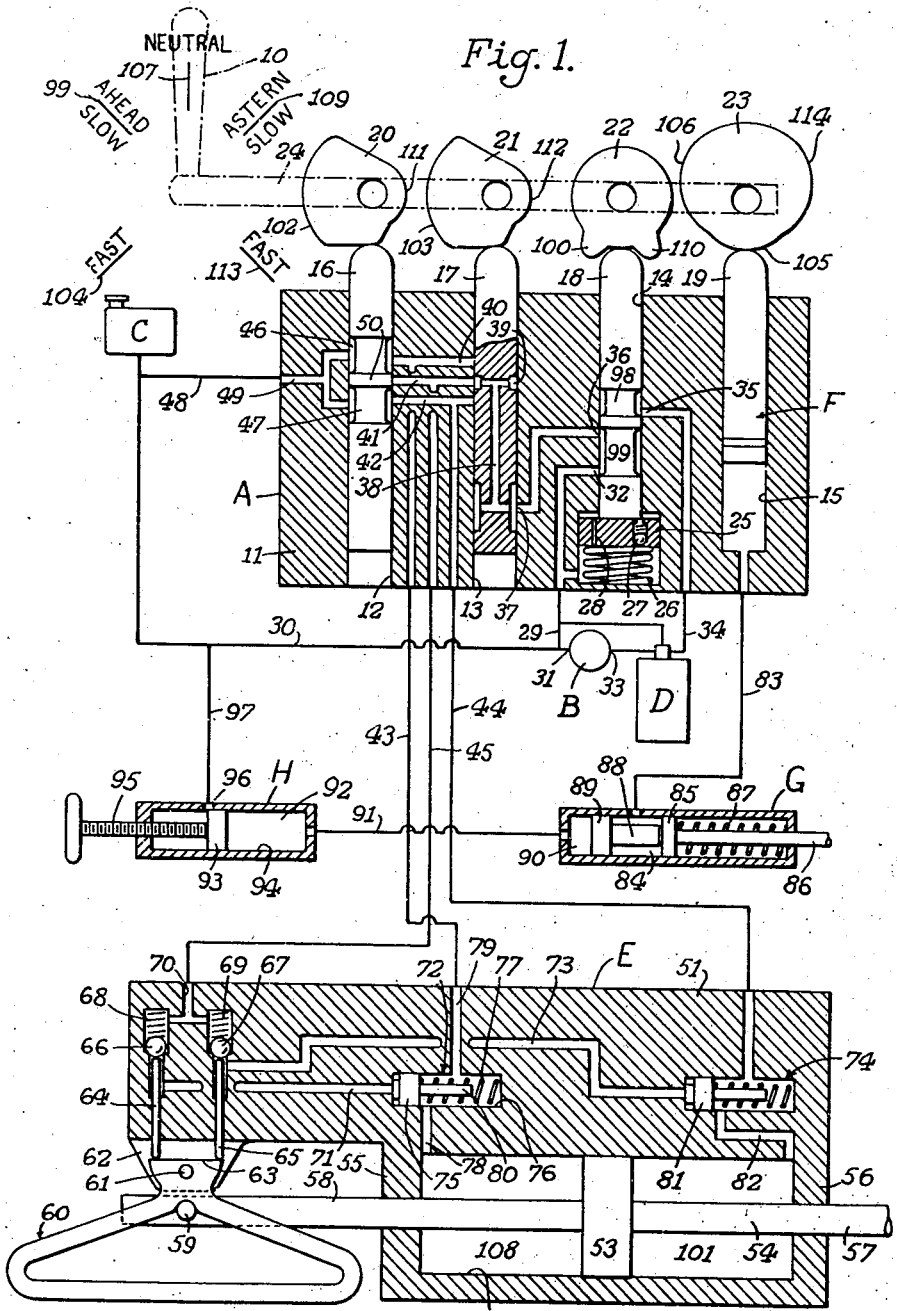
Figure 1 shows one form of remote control system which is operated by liquid pressure and is adapted to control the change-speed gear box and the engine of a boat.

The system shown in Figure 1 comprises briefly a control valve device A having an operating handle 10 which is adapted to move in either direction from the neutral position, which is indicated at 107. A motor driven pump B receives liquid from a reservoir C and delivers it under pressure to an accumulator D incorporating the usual cut-out valve, the pressure liquid being fed as required from the accumulator to a double-acting motor unit E, depending upon the action of the control valve device A. Incorporated in the latter is a master cylinder device F, which is also actuated by the handle 10 and is adapted to control hydraulically a throttle actuating motor cylinder G for regulating the speed of the engine (not shown), a hydraulic adjusting device H being provided for initially setting the throttle so as to give the desired minimum engine speed.

The control valve device A has a body 11 formed with four mutually parallel bores 12, 13, 14 and 15 containing four slidable plunger members, namely, a drain controlling valve plunger 16; a pressure controlling valve plunger 17; a time-controlled valve plunger 18; and a master cylinder plunger 19. These are actuated by means of cams 20, 21, 22 and 23, respectively, which are mounted upon a shaft 24 so as to lie in parallel planes, each coincident with the axis of the corresponding plunger 16—19. In Figure 1, however, the cams 20—23 are shown in the plane of the drawing in order that their shapes may be seen; the various operating positions of the handle 10, as indicated by the legends "Ahead," "Neutral," "Astern," "Slow" and "Fast," are correspondingly turned into the plane of the drawings.

Means such as springs (not shown) are provided to maintain the plungers 16, 17 and 19 in contact with the cams 20, 21 and 23, respectively, while in the case of the plunger 18, the lower end of the latter is enlarged to form a dash-pot piston 25 which slides in a substantially liquid-tight manner within an enlarged part of the bore 14 and is urged upwards by a coiled compression spring 26. The piston 25 has a non-return ball valve 27 which opens during downward movement of the piston 25 but closes when the piston tends to move upwards on account of the spring 26, thus delaying the upward movement of said piston 25, for the liquid trapped above said piston can only escape at a slow rate through a constriction indicated at 28. The space below the piston 25 is in permanent communication with the reservoir C by a connection 29 leading into a pipe 30 joining the reservoir C to the inlet 31 of the pump B; the connection 29 also leads to a port 32 in the bore 14 as shown. The delivery connection 33 of the pump B leads to the accumulator D and the outlet connection 34 from said accumulator D leads to another port 35 in the bore 14. A third port 36 in this bore leads to a port 37 in the bore 13, which port is at all times in communication with an axial passage 38 leading axially through the plunger 17 to an annular groove 39 formed therein. This annular groove is adapted to register with any one of three passages 40, 41 and 42, depending upon the position of the plunger 17; these passages lead into the bore 12 at spaced positions and are also in permanent communication with three pipe lines leading to the motor cylinder unit E. These comprise a pair of main pipe lines 43 and 44 connected with the passages 40 and 42, respectively, and an auxiliary pipe line 45 which is connected with the passage 41. The plunger member 16 has a pair of wide annular grooves 46 and 47 which are permanently connected with the reservoir C by way of a pipe 48 and a branched connection 49. It will be noted that a circumferential land 50 upon the plunger member 16 is adapted to close either one of the passages 40—42, depending upon the position of the plunger 16, but the other two of said passages are connected with the reservoir C. As the cams 20 and 21 are identical in shape, the plungers 16 and 17 move in unison and the land 50 therefore closes that particular passage 40—42 which is in communication with the annular groove 39.

The motor cylinder unit E comprises a body 51 formed with a cylinder bore 52 within which a motor piston 53 is slidably mounted. A piston rod 54 extends through both end walls 55 and 56 of the cylinder, its right-hand end 57 being connected with the usual change-speed lever or equivalent (not shown) of the transmission gear box, while the left-hand end 58 is provided with a projecting pin 59 engaging within a rocker 60 in the form of a substantially rectangular frame. This rocker 60 is pivoted at 61 to a projection 62 formed upon the body 51, the upper surface 63 of said rocker adapted to lift either one of a pair of push rods 64 and 65, depending upon the direction of angular movement of said rocker 60. The push rods 64 and 65 are adapted to co-operate with ball valves 66 and 67, respectively, so as to lift either one of said ball valves against the action of a corresponding spring 68 or 69 depending upon the direction in which the rocker 60 is moved angularly. The spaces above the ball valves 66 and 67 are connected together by a branched passage 70, leading to the auxiliary pipe line 45; the space below the ball valve 66 is connected by a passage 71 with a cut-off valve device 72, while the space below the ball valve 67 is similarly connected by a passage 73 with a cut-off valve device 74. The cut-off valve device 72 comprises a partition piston 75 which is slidable within a bore 76 formed in the body 51 and is urged towards the left by a coiled compression spring 77. A passage 78 leads from the left-hand end of the cylinder bore 52 to a position adjacent the left-hand end of the bore 76, while a passage 79 connected with the main pipe line 43 enters the bore 76 at a position to the right of the passage 78. Thus when liquid is fed through the passage 71 it displaces the partition piston 75 to the right until the passage 78 is uncovered, but such movement is limited by a stem 80, thus ensuring that while passage 78 is connected with the passage 71, said passage 78 is isolated from the passage 79. Similarly when the partition piston 75 is in its normal position, as shown, the passages 79 and 78 are connected together but are isolated from passage 71. The cut-off valve device 74 is of similar construction and has a partition piston 81 which, in the position shown, enables pressure liquid to flow from the main pipe line 44 to passage 82 leading to the right-hand end of the cylinder bore 52. On the other hand, when pressure liquid is supplied through the passage 73 from the auxiliary pipe line 45, the partition piston 81 is urged towards the right and permits said liquid to flow into the passage 82, which latter is isolated from the main pipe line 44. If desired, the pin 59 may be adjustable on the piston rod 54 to permit adjustment of the intermediate position of the piston 53.

With regard to the throttle controlling means, the bore 15 of the master cylinder F is connected by a pipe 83 with a working space 84 within the throttle motor cylinder G. The piston of the latter is indicated at 85 and has a piston rod 86 connected with the usual engine throttle or equivalent (not shown), the piston being retracted by a coiled compression spring 87. The retractional movement (i. e. movement towards the left) is, however, limited by a projection 88 upon a stop piston 89 sliding in a liquid-tight manner within the motor cylinder. A liquid space 90 behind the stop piston 89 is connected by a pipe 91 with the space 92 at the right-hand end of the hydraulic adjusting device H. The latter has a piston 93 movable along a cylinder bore 94 by means of a screw 95, so that as the piston 93 is advanced liquid is forced along the pipe 91 and correspondingly advances the stop piston 89, thus regulating the fully retracted position of the motor piston 85. A port 96 in the cylinder 94 is in communication with the reservoir by a connection 97 so that, if necessary, the liquid within the spaces 90—92 and the pipe 91 can be replenished by withdrawing the piston 93 beyond the port 96.

The system shown in Figure 1 operates as follows. When the handle 10 is in the "neutral" position, as shown, the plungers 16 and 17 are in their intermediate positions, while the plungers 18 and 19 are fully raised. With the system in a static condition (i. e. after sufficient time has elapsed since the last actuation of the handle 10 for allowing the plunger 18 to resume its fully raised position) the outlet connection 34 from the accumulator D merely leads into a groove 98 in the plunger 18, while a similar but wider groove 99 places the port 36 in communication with the port 32 and thus with the reservoir C; as a consequence of this the auxiliary pipe line 45 is in communication with the reservoir. Also the main pipe lines 43 and 44 are both in communication with the reservoir C by way of the grooves 46 and 47, respectively, and the branched passage 49. When the handle 10 is moved, say in an anti-clockwise direction to the position indicated at 99, the initial part of this movement causes a lobe 100 upon the cam 22 to depress the plunger 18 to the maximum extent, this being sufficient to bring the groove 98 into communication with the port 36, which latter is, of course, then cut off from the port 32 leading to the reservoir C. When the handle 10 has reached the position 99, the lobe 100 has passed the top of the plunger 18 so that the latter is then free to return at a slow rate to its uppermost position; as a result pressure liquid from the accumulator D is fed for a predetermined period (depending upon the size of the constriction 28) to the port 36, after which period said port 36 again becomes connected with the reservoir C.

The movement of the handle 10 to the position 99 causes the plungers 16 and 17 to be depressed by the cams 20 and 21, the extent of the movement in the case of the plunger 17 being sufficient to bring the groove 39 into register with the passage 42, while, in the case of the plunger 16, the land 50 registers with the other end of the passage 42. It will thus be seen that for the period when the port 36 is connected with the accumulator D, pressure liquid is fed from the latter through the plunger 17 to the passage 42 and thus by way of the main pipe line 44 to the passage 82, and thence into the right-hand working space 101 of the motor cylinder unit E. This pressure liquid forces the piston 53 towards the left until the end wall 55 is reached and the piston 53 is arrested. The movement of the piston 53 is, of course, transmitted to the piston rod 57 and the latter moves the usual selector lever (not shown) of the change-speed gear box to its "ahead" position. If the handle 10 is moved beyond the position 99, the arcuate portions 102 and 103 of the cams 20 and 21 slide past the plungers 16 and 17 without changing the positions of these plungers. From the position 99 to the position 104 the handle 10, however, serves to adjust the engine throttle by means of the cam 23 and the plunger 19. That part 105 of the periphery of the cam 23 corresponding to the movement of the handle 10 to the position 99 is of constant radius with respect to the axis of the shaft 24, so that the plunger 19 is not shifted; from the position 99 of the handle 10 to the position 104, however, the curved part 106 (which is shaped in a spiral or involute fashion) engages with the top of the plunger 19, thus progressively depressing the latter so that the liquid, which is rejected from the bore 15, passes to the working space 84 of the motor unit G and advances the motor piston 85 so opening the throttle until maximum speed is reached with the handle 10 in the position 104. The handle 10 can, of course, be moved backwards and forwards between the positions 99 and 104 as required to control the speed of the engine without having any effect upon the adjustment of the motor cylinder unit E.

The next time the handle 10 is moved back to the "neutral" position, indicated at 107, the lobe 100 is forced past the top of the plunger 18, thus depressing the latter, while, at the same time, plungers 16 and 17 are restored to the positions shown in Figure 1. For a brief period, therefore (i. e. while the plunger 18 is slowly rising on account of the spring 26) pressure liquid, which is fed from the accumulator D, passes through the port 36, along the passage 38, through the plunger 17 and thence to the passage 41 and the auxiliary pipe line 45. It will be remembered that the previous movement of the handle 10 caused the piston 53 of the motor unit E to be moved to the left and this, of course, caused the pin 59 to tilt the rocker 60 in a clockwise direction so that it raised the push rod 64 and lifted the ball valve 66 off its seating. As pressure liquid is now being fed from the auxiliary pipe line 45, therefore, liquid passes the ball valve 66; said liquid then flowing along the passage 71 and displacing the partition piston 75, thus enabling said liquid to flow through the passage 78 to the left-hand working space 108 of the motor unit E. As a consequence the piston 53 moves to the right, but when it reaches its central position corresponding to the "neutral" position of the gear box selector lever, the pin 59 restores the rocker 60 to its intermediate position as shown, thus closing the ball valve 66. As a consequence, no further liquid can be supplied through the auxiliary pipe line 45, and when the plunger 18 of the control valve device A regains its uppermost position, said auxiliary pipe line 45 is again placed in communication with the reservoir C. Should the piston 53 travel beyond its central position, however, the rocker 60 will be tilted in the opposite direction, i. e. anticlockwise; thus forcing the ball valve 67 off its seat and permitting sufficient liquid from the auxiliary pipe line 45 to pass into the right-hand working space 101 to return the piston 53 by the requisite amount.

The same sequence of operations occurs when the handle 10 is moved to the position 109 for bringing the selector lever of the gear box to its "astern" position. During this movement of the handle 10, a second lobe 110 upon the cam 22 depresses the plunger 18, while the plungers 16 and 17 are allowed to rise until they engage with curved portions 111 and 112 of constant small radius upon the cams 20 and 21, respectively. Movement of the handle 10 from the position 109 to the position 113 again serves to adjust the throttle motor unit G, the curved portion 114 of the cam 23 acting to depress the plunger 19.

Figure 2:
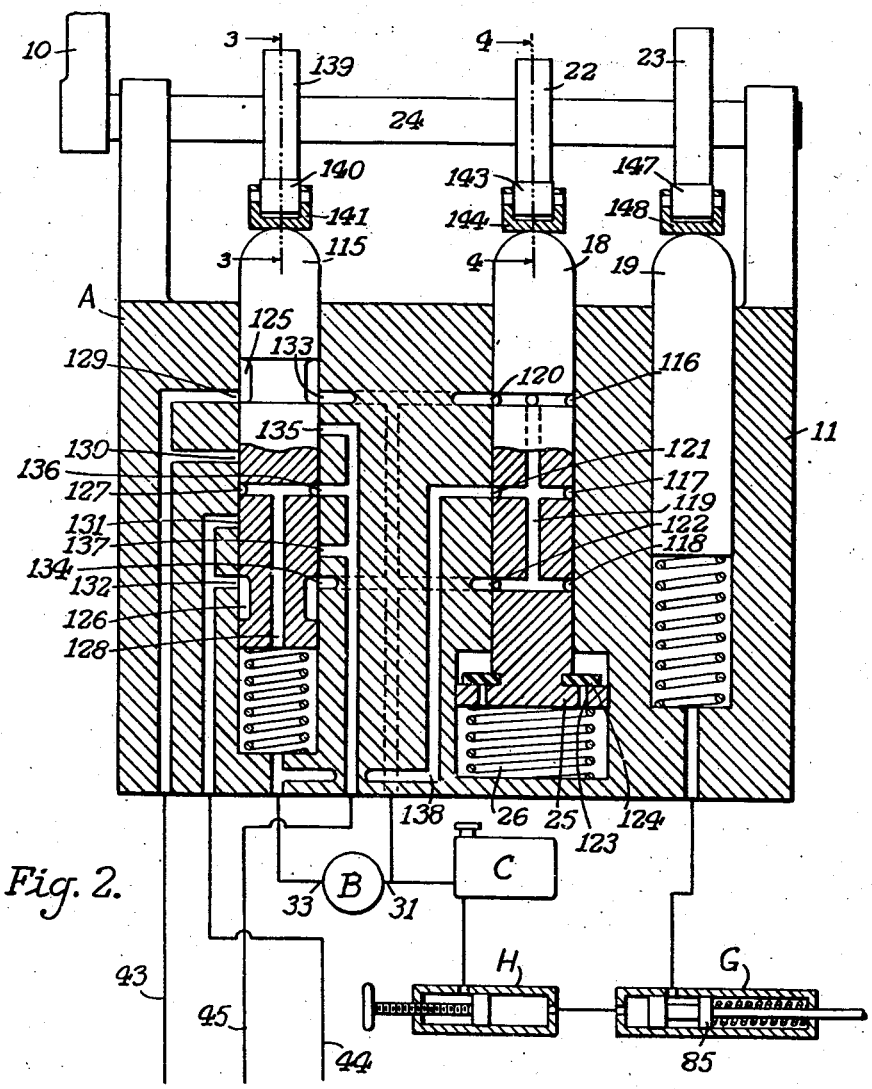
Figure 2 is a sectional elevation of a modified form of control valve device, certain associated parts of the system being shown together with the relevant pipe connections.
Figure 3:
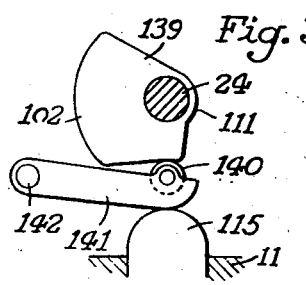
Figure 3 is a fragmentary sectional elevation taken on the line 3—3 of Figure 2.
Figure 4:
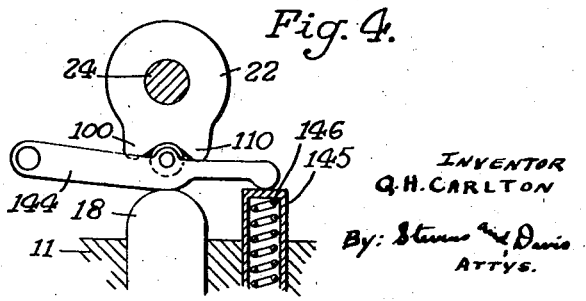
Figure 4 is a similar view taken on the line 4—4 of Figure 2.

The modified construction of control valve device A, shown in Figures 2 to 4, operates in a somewhat similar manner to that previously described, but it is adapted for use where it is not desired to instal an accumulator, the pump B having its inlet 31 connected directly with its outlet 33 whenever it is not required to supply pressure liquid for actuating the motor unit E. Also, in the modified arrangement, the functions of the previously described plungers 16 and 17 are carried out by a single plunger, indicated at 115 in Figure 2. The plunger 19 and cam 23 are the same as before and serve to actuate a throttle motor cylinder unit G, the fully retracted position of which is regulated by a hydraulic adjusting device H; the latter is connected with the reservoir C as before.

The time-controlled valve plunger is again indicated at 18, but in this instance it is formed with three axially spaced circumferential grooves 116, 117 and 118, connected permanently together by a longitudinal passage 119. When the plunger 18 is in its fully raised position, these grooves register with three ports 120, 121 and 122, respectively, but while the plunger is depressed, these ports are isolated from one another. The lower end of the plunger 18 is fitted with a piston 25 as before, having a number of passages 123 adapted to be covered by an annular flap valve member 124 acting as a non-return valve. The requisite leakage passage to control the upward movement of the plunger 18 is, in this instance, obtained by making the piston 25 a slightly loose fit in the bore.

The plunger 115 has adjacent its upper and lower parts a pair of fairly wide circumferential grooves 125 and 126; between these it is formed with an annular narrow groove 127 which communicates by a longitudinal passage 128 with the space below the plunger 115. A pair of ports 129 and 130 are connected with the main pipe line 43, while a corresponding pair of ports 131 and 132 communicate with the other main pipe line 44. On the other side of the bore within which the plunger 115 slides, ports 133 and 134 are connected by the passages shown in dotted lines with the ports 120 and 122, as well as with the reservoir C. Also three spaced ports 135, 136 and 137 are connected together and lead to the auxiliary pipe line 45. The space below the plunger 115 is connected by a passage 138 with the port 121 and is also connected with the outlet 33 of the pump B.

The plunger 115 is actuated by a cam 139 (see Figure 3) which corresponds in shape to each of the cams 20 and 21, shown in Figure 1. Instead of bearing directly upon the top of the plunger 115, however, it co-operates with a roller 140 carried by an arm 141 which is pivoted at 142, the arm itself being arranged to bear against the plunger 115. In a similar manner, the cam 23 acts upon the plunger 19 through a roller 147 and rocker 148. The cam 22 (see Figure 4) which actuates the time-controlled valve plunger 18, operates through a roller 143 carried by an arm 144, said arm being at all times urged upwards by a plunger 145 containing a coiled compression spring 146; by this means the arm 144 is held free of the plunger 18 and the slow upward movement of the latter is therefore not impeded by the arm 144.

The operation of the control valve device shown in Figure 2 is briefly as follows. As in the previous example, whenever the parts of the control valve device are in a static condition (i. e. after sufficient time has elapsed since the last actuation of the handle 10 for allowing the plunger 18 to resume its fully raised position) all three of the pipe lines 43, 44 and 45 are connected with the reservoir C. Angular movement of the handle 10 in an anti-clockwise direction is arranged to depress the plunger 115 causing pressure liquid to be supplied for a predetermined period to the main pipe line 44. On the other hand, movement of the handle 10 from the "neutral" position in a clockwise direction allows the plunger 115 to rise and thus pressure liquid is fed to the other main pipe line 43. Whenever the handle 10 is returned to the central "neutral" position, pressure liquid is supplied for a predetermined period to the auxiliary pipe line 45. In order to achieve these results, the parts co-operate in the following manner. Whenever the plunger 18 is in its fully raised position, the output from the pump B passes through the passage 138 and can return freely to the reservoir C by way of the ports 120 and 122. When, however, the plunger 18 is depressed and while it is returning to its raised position, the ports 120, 121 and 122 are blocked so that the pump B builds up pressure and the delivery passes through the passage 128 in the plunger 115.

Now assuming that the handle 10 is moved from its "neutral" position in an anti-clockwise direction so as to depress the plunger 115, the pressure liquid, which is temporarily being supplied at working pressure by the pump B, passes through the groove 127 to the port 131 and thence to the main pipe line 44. If the control valve device is connected to a motor unit similar in form to that shown at E in Figure 1, the admission of pressure liquid to the main pipe line 44 would, of course, move the piston 53 to the left-hand end of its stroke. It should be noted that the downward movement of the plunger 115 has caused the groove 126 to pass beyond the port 132, so that the latter is closed. During this action the auxiliary pipe line 45 is maintained in communication with the reservoir C as the groove 125 bridges the ports 133 and 135; also said groove 125 is still in communication with the port 129, thus connecting the main pipe line 43 with the reservoir C.

When the handle 10 is returned to the "neutral" position, the pressure liquid, which is delivered by the pump B (while the plunger 18 is rising), passes from the groove 127 to the port 136 and thence on to the auxiliary pipe line 45, thus returning the piston 53 of the motor unit E (see Figure 1) to its central position. With the plunger 115 in its mid position, both of the main pipe lines 43 and 44 are connected with the reservoir C by way of the grooves 125 and 126, respectively, which, of course, are in register with the ports 133 and 134.

As the handle 10 is moved in an anti-clockwise direction to bring the plunger 115 to its fully raised position, the pressure liquid, which is delivered by the pump B (while the plunger 18 is rising), passes through port 130 with which the groove 127 now registers, thus causing said liquid to be delivered to the main pipe line 43 so that it moves the piston 53 of the motor unit E (see Figure 1) to the right-hand end of its stroke. With the parts in this position, the other main pipe line 44 is connected with the reservoir by way of the ports 132 and 134 which are connected together by the groove 126, while the auxiliary pipe line 45 communicates with the reservoir by way of the port 137 which has been uncovered by the groove 126.

Figures 5, 6, 7, 8:
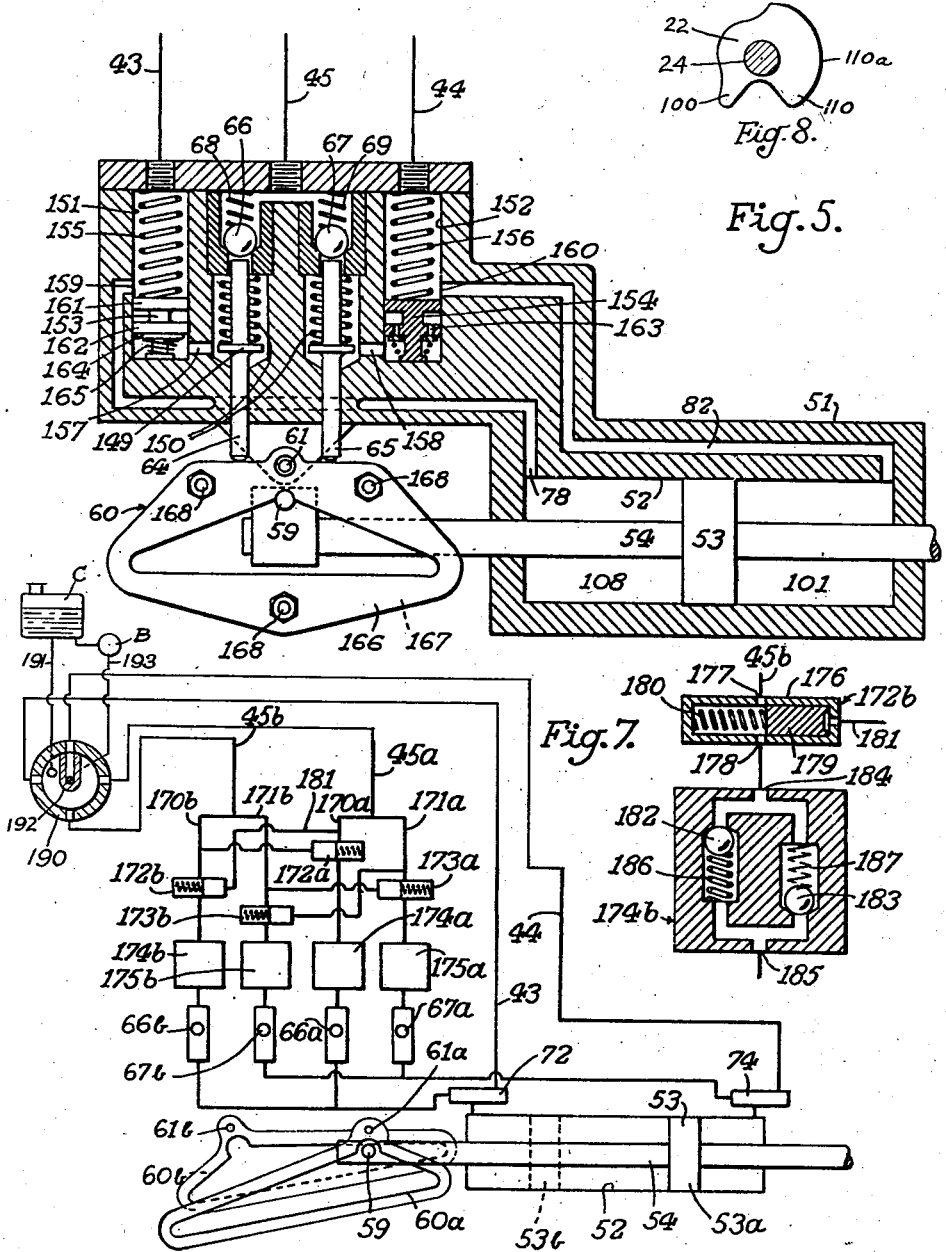
Figure 5 is a sectional elevation of a modified form of a motor cylinder unit and associated valve mechanism.
Figure 6 shows an arrangement of motor cylinder having two auxiliary pipe lines and valve means adapted to cause the piston to assume either of a pair of predetermined positions when liquid is fed through one or other of said auxiliary pipe lines.
Figure 7 is a sectional diagram of one of the resistance valves shown in Figure 6.
Figure 8 is a side elevation of a modified form of cam for the time-controlled valve plunger.

The construction of motor cylinder unit E, which is shown in Figure 5, corresponds largely with the one already described, but it incorporates a modified form of cut-off valve device. The body 51 is again formed with a bore 52 containing a motor piston 53 and the piston rod 54 of the latter has a pin 59 co-operating with a somewhat triangular rocker 60 pivoted at 61. Each of the push rods 64 and 65, which co-operate with the rocker 60, is formed with a flange 149 by which it is urged downwards owing to the action of a relatively strong coiled compression spring 150. Each of the ball valve members 66 and 67 is urged on to its seating by a relatively weak coiled compression spring, these being indicated at 68 and 69, respectively. The cut-off valve devices comprise a pair of vertical bores 151 and 152 containing slidable partition pistons 153 and 154, which are urged downwards by coiled compression springs 155 and 156. A passage 157 connects the lower end of the bore 151 with the space below the ball valve member 66, while, in a similar manner, the space below the ball valve member 67 is connected with the lower end of the bore 152 by a passage 158. The passage 78, from the left-hand working space 108 of the motor cylinder, enters the bore 151 by a port 159 just above the partition piston 153 when the latter is in its lowermost position, and in a similar manner the passage 82 from the opposite end of the cylinder bore 52 enters the bore 152 by a port 160. It is important that the ports 159 and 160 should not become blocked in the event of the corresponding partition pistons 153 and 154 not returning fully to their lowermost positions, and in order to avoid such blockage each of the partition pistons is circumferentially grooved leaving a pair of axially spaced lands 161 and 162, each of which is made slightly narrower in width than the corresponding port 159 or 160. Moreover, the lower land 162 is drilled parallel to the axis to form a number of passages 163, which latter are normally closed by a light annular plate 164 which is lifted by a coiled compression spring 165 so as to act as a non-return valve. If, therefore, one of the partition pistons should become jammed in an elevated position, liquid which is pushed out of the cylinder bore 52 by movement of the motor piston 53 can easily displace the annular plate 164 and pass back to the reservoir of the system. It should be mentioned that in each case the spring 155 or 156 is sufficiently strong to enable the downward force exerted upon the partition piston 153 or 154 to develop sufficient pressure to open the corresponding ball valve 66 or 67 against the action of its relatively light closing spring 68 or 69. Pressure liquid which is fed to either of the main pipe lines 43 or 44 passes through the corresponding working space 108 or 101 of the motor cylinder by way of the port 159 or 160, whereas when pressure liquid is fed through the auxiliary pipe line 45 it flows past whichever of the ball valves 66 or 67 is held off its seating and then reaches the appropriate port 159 or 160 by raising the corresponding partition piston 153 or 154.

In the construction shown in Figure 5, the rocker member 60 comprises a pair of similar plates 166 and 167, which are connected together by bolts 168, spacing members (not shown) being provided to hold the plates 166 and 167 apart so that the piston rod 54 passes between them.

The invention is also applicable in cases where it is desired that the motor piston shall be brought automatically to any one of a plurality of positions intermediate the ends of its stroke, a corresponding number of rocker members 60 being provided; such an arrangement adapted to have two intermediate positions, is shown in Figure 6. For moving the motor piston to a position indicated at 53a, a rocker member 60a is pivoted at 61a for co-operation with the pin 59 carried by the piston rod 54; the rocker 60a operates push rods (not shown) in the manner previously described so as to open one or other of a pair of valves 66a and 67a. For moving the motor piston of the second intermediate position, indicated at 53b, a second rocker member 60b, which is shown in dotted lines for clarity, also engages with the pin 59 and is pivoted at 61b so as to operate either of a pair of valves 66b or 67b. The spaces below the valves 66a and 66b are connected together and lead to a cut-off valve device 72, which is similar in construction to that shown in Figure 1, while the valves 67a and 67b are similarly connected with a cut-off valve device 74. The main pipe line 43 is also adapted to supply pressure liquid through cut-off valve device 72 for moving the motor piston to the extreme right-hand end of the cylinder 52, while the other main pipe line 44 acts to move the motor piston to the left-hand end of its stroke. An auxiliary pipe line 45a, through which pressure liquid is fed to move the piston to the position 53a, has a pair of branches 170a and 171a leading through hydraulically actuated stop valve devices 172a and 173a to corresponding resistance valve units 174a and 175a, the outlet connections from which lead to the valves 66a and 67a. In a similar manner a second auxiliary pipe line 45b corresponding with the piston position 53b feeds through branches 170b and 171b and stop valve devices 172b and 173b to resistance valve units 174b and 175b to the valves 66b and 67b respectively. The arrangement and function of the stop valve devices, which are all similar, and the resistance valve units will be clear from Figure 7, which shows as an example the stop valve device 172b and the resistance valve unit 174b. The stop valve device comprises a cylinder 176 having diametrically opposite ports 177 and 178, which normally communicate with one another, but which are adapted to be isolated by a sliding piston member 179. This piston member is normally urged out of engagement with the ports 177 and 178 by a coiled compression spring 180, the force of which is, however, overcome when pressure liquid is supplied through an end connection 181. It will be noted from Figure 6 that this leads to the branch 170a; in a similar manner the end connection of the stop valve device 173b leads to the branch 171a; the end connection of the stop valve device 172a is fed from the branch 170b; and the end connection of the stop valve device 173a is fed from the branch 171b.

The resistance valve unit 174b, shown in Figure 7, has a pair of non-return valves, which are indicated at 182 and 183, these being connected in parallel but in opposite directions between the external connections 184 and 185 of the unit. The valve 182 is urged on to its seating by a relatively strong coiled compression spring 186 so as to allow pressure liquid to flow from the connection 184 to the connection 185 only after a substantial pressure has been built up sufficient to overcome the force of the spring 186. On the other hand the spring 187 by which the valve 183 is closed, is relatively weak so that the valve 183 offers practically no resistance to the flow of liquid in the opposite direction, normally from the connection 185 to the connection 184. The port 177 is, of course, fed from the branch 170b, while the connection 185 leads to the valve device 66b, the other units 174a, 175a, and 175b being correspondingly arranged.

A pump B fed from a reservoir C is arranged to feed liquid under pressure to any one of the pipe lines 43, 44, 45a and 45b, the remaining three of said pipe lines being in communication with the reservoir C. This effect may be obtained by means of a valve which is shown diagrammatically and comprises a hollow cylindrical casing 190, the wall of the latter being provided with four equidistantly spaced ports connected respectively with the pipe lines 43, 44, 45a and 45b. The interior of the casing is connected with the reservoir C by a pipe 191. The casing contains a rotatable valve member 192 the interior of which is in permanent communication with the delivery of the pump B by a pipe 193 and is arranged to divert said delivery to any one of the pipe lines 43, 44, 45a, and 45b, depending upon the position to which the valve member 192 is turned.

It will be seen that with the parts in the positions shown in Figure 6, the rocker member 66b is holding the valve 67b open. If pressure liquid is fed to the auxiliary pipe line 45b it builds up pressure in the branches 170b and 171b, owing to the action of the resistance units 174b and 175b, which pressure is communicated to the stop valve devices 172a and 173a so that they obstruct both of the branches 170a and 171a. When the liquid pressure in the branch 171b has reached a predetermined value it flows through the resistance unit 175b, the valve 67b and the cut-off valve device 74, said pressure liquid then flowing into the cylinder 52 and urging the piston 53 towards the left, the liquid expelled from the cylinder passing back to the reservoir C by way of the main pipe line 43. When the piston 53 reaches the position 53b the rocker member 60b becomes centralised, thus closing the valve 67b and stopping the further supply of pressure liquid. During operation in this manner the stop valves 172a and 173a have, of course, prevented the pressure liquid from the auxiliary pipe line 45b from opening the valve 67a and thence flowing through the branches 171a and 170a through the open valve 66a to the left-hand end of the cylinder 52. The provision of the resistance valve units 174a, 175a, 174b and 175b ensure that the appropriate stop valves are operated before pressure liquid is fed to the motor unit. To summarise, therefore, pressure liquid fed to the main pipe line 43 moves the motor piston to the extreme right-hand end of its stroke; pressure liquid fed to the auxiliary pipe line 45a moves the piston to the position 53a; pressure liquid fed to the auxiliary pipe line 45b moves the piston to the second intermediate position 53b; and pressure liquid fed to the main pipe line 44 moves the piston to the extreme left-hand end of its stroke.

It will be appreciated that the constructions which have been described are given merely by way of example and that the improved form of control valve device and motor cylinder unit may be used independently if desired; thus any form of control or selector valve device capable of admitting pressure fluid to any one of the three pipe lines may be used to bring about the actuation of the improved motor cylinder unit, while it will be understood that the arrangement of the control valve device whereby the pipe lines are placed in communication with the reservoir after a predetermined period may be adopted in various forms of liquid pressure remote control system.

Further, the operating means for the time-controlled valve may be arranged to maintain said valve in its "on" position when the piston of the motor cylinder unit is to be held in one or each of its two end positions, the lobes of the operating cam conveniently being extended circumferentially for this purpose. Thus, for some change-speed gear boxes it is necessary to maintain pressure on the selector lever to keep the latter in its "reverse" position, and this can readily be effected by circumferentially extending the lobe 110 of the cam 22 in a direction away from the neutral position, the cam then being substantially of the shape shown in Figure 8 where the extension of the lobe 110 is indicated at 110a.

What I claim is:

1. A motor unit for a fluid-pressure control system, including a block-like unit formed with a closed cylinder, a piston member operative in the cylinder and dividing the same into two working chambers, the block unit being formed with a conduit opening into one end of the cylinder and with a second conduit opening into the opposite end of the cylinder, valves mounted in the block unit and respectively controlling conduits leading into the respective ends of the cylinder, distributing valve means for selectively directing the pressure fluid into either end of the cylinder through the conduits or to both valves to admit pressure flow through the valve-controlled conduits, means operated in the movement of the piston member for selectively opening either valve in accordance with piston member movement, a source of fluid under pressure, a timing valve, means biasing said timing valve to closed position, means connecting the source of fluid under pressure with the inlet of the timing valve, means connecting the outlet of the timing valve with the inlet of the distributing valve means, manually operated means for biasing the timing valve to open position to establish connection between the source of fluid under pressure and the distributing valve means, and damping means acting on said timing valve to interpose a time lag intermediate the manual opening thereof and the return to normal closed position.

2. A motor unit for a fluid pressure control system, including a block unit formed with a closed cylinder, said block being formed with independent service conduits opening to the respective ends of the cylinder, said block being also formed with auxiliary service conduits respectively leading to each end of the cylinder, a normally closed valve for each auxiliary conduit, a piston member operative in the cylinder, means directly operated by the piston member for opening one or the other of said valves in accordance with piston-member movement, and manually operated means for directing such pressure fluid to either service conduit selectively or to both valve-controlled auxiliary conduits simultaneously, a source of fluid under pressure, a timing valve, means biasing said timing valve to closed position, means connecting the source of fluid under pressure with the inlet of the timing valve, means connecting the outlet of the timing valve with the inlet of the manually operated directing means, manually operated means for biasing the timing valve to open position to establish connection between the source of fluid under pressure and the manually operated directing means, and damping means acting on said timing valve to interpose a time lag intermediate the manual opening thereof and the return to normal closed position.

3. In a liquid pressure remote control system, a motor unit including a cylinder and a member mounted in said cylinder for reciprocation and serving to divide the cylinder into two working spaces, means for independently directing admission of pressure fluid to the respective ends of the cylinder, means for simultaneously directing pressure fluid to an inlet common to independent flow paths to the respective ends of the cylinder, manually operable means for admitting fluid pressure to the cylinder and selectively directing such admission to either of the independent admission means or to the inlet common to said flow paths, and a valve controlling each flow path with respect to the inlet, said valves being selectively controlled by and in the movement of the member, a source of fluid under pressure, a timing valve, means normally biasing said timing valve to closed position, a conduit connecting the source of fluid under pressure with the inlet of the timing valve, a conduit connecting the outlet of the timing valve with the manually operable means for admitting fluid pressure to the cylinder, said manually operable means including means for opening said timing valve, and damping means for interposing a time lag intermediate the opening of said timing valve and the return thereof to closed position.

4. In a liquid pressure remote control system, a motor unit including a cylinder and a member mounted in said cylinder for reciprocation and serving to divide the cylinder into two working spaces, a source of fluid under pressure, means for independently directing admission of pressure fluid to the respective ends of the cylinder, means for simultaneously directing pressure fluid to an inlet common to independent flow paths to the respective ends of the cylinder, manually operable means for admitting fluid pressure to the cylinder and selectively directing such admission to either of the independent admission means or to the inlet common to said flow paths, said manually operable means including directing means for such admitted pressure fluid to either of the independent admission means or to the inlet common to the independent flow paths, a valve controlling each flow path with respect to the inlet, said valves being selectively controlled by and in the movement of the member, a timing valve, a spring normally biasing said timing valve to closed position, a conduit connecting the inlet of the manually operable means for admitting fluid pressure to the cylinder with the outlet of the source of fluid under pressure through said timing valve, means constituting a part of said manually operable means for opening said timing valve against the thrust of said spring, and damping means for interposing a time lag intermediate the opening of said timing valve and the closure thereof under the bias of said spring.

5. In a liquid pressure remote control system, a motor unit comprised of a cylinder and a member mounted in said cylinder for reciprocation and dividing said cylinder into a pair of working spaces, a source of fluid under pressure, a distributing valve including normally closed means for selectively transmitting a fluid from an inlet to either of a pair of outlets, a control valve device, means connecting the control valve device with the source of fluid under pressure, means connecting the control valve device to the inlet of the distributing valve, means connecting the outlets of the distributing valve with opposite working spaces of the cylinder, means responsive to the direction of movement of the member in said cylinder away from a predetermined position for opening one or the other of the selective transmitting means in the valve, means defining a chamber in each of the means connecting the outlets of the valve with opposite working spaces of the cylinder, a partition piston in each chamber, a main fluid pressure line connecting each chamber with the control valve device, the piston in each chamber being arranged to be forced in one direction by pressure fluid supplied through the respective main line and in the other direction by fluid pressure supplied through the distributing valve, the resulting movement of the partition piston serving to connect the respective working space of the motor unit with either of the connecting means or line through which fluid is being supplied and to isolate said working space from the other, means for setting the control valve device to selectively supply fluid from the source to one or the other of said main lines or the means connected to the inlet of the distributing valve, and means responsive to operation of said setting means for limiting the time of supply of pressure fluid in the selected direction to a predetermined value.

6. A liquid pressure remote control system as claimed in claim 5 wherein the means for limiting the time of supply comprises a piston valve device and wherein a dash-pot governs the movement of the piston member.

7. A liquid pressure remote control system as claimed in claim 5 wherein the means for limiting the time of supply comprises a piston valve device, wherein the means for setting the control valve device includes a cam for momentarily displacing said piston valve, a spring normally biasing said piston valve in a direction opposed to that in which it is moved by the cam and means for retarding the action of said spring.

QUINTIN HEALEY CARLTON.